United States Patent
Vaghasiya et al.

(10) Patent No.: US 12,248,681 B2
(45) Date of Patent: Mar. 11, 2025

(54) SEQUENTIAL WRITE OPERATIONS USING MULTIPLE MEMORY DIES

(71) Applicant: Micron Technology, Inc., Boise, ID (US)

(72) Inventors: Rakeshkumar Dayabhai Vaghasiya, Hyderabad (IN); Anilkumar Rameshbhai Sindhi, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 59 days.

(21) Appl. No.: 17/884,422

(22) Filed: Aug. 9, 2022

(65) Prior Publication Data

US 2024/0053900 A1 Feb. 15, 2024

(51) Int. Cl.
*G06F 3/06* (2006.01)

(52) U.S. Cl.
CPC .......... *G06F 3/0616* (2013.01); *G06F 3/0629* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 6,728,840 B1* | 4/2004 | Shatil | ......... | G06F 12/0866 712/240 |
| 6,894,913 B2* | 5/2005 | Yamauchi | ......... | G11C 16/0491 365/51 |
| 8,458,416 B2* | 6/2013 | Warren | ......... | G11C 11/5621 711/134 |
| 8,560,919 B2* | 10/2013 | D'Abreu | ......... | G06F 11/1072 714/778 |
| 8,738,974 B2* | 5/2014 | Honda | ......... | G06F 11/141 714/763 |
| 8,954,708 B2* | 2/2015 | Kim | ......... | G06F 12/0246 711/202 |
| 2020/0304148 A1* | 9/2020 | Yang | ......... | G11C 16/10 |
| 2021/0303206 A1* | 9/2021 | Saxena | ......... | G06F 3/0604 |
| 2022/0113898 A1* | 4/2022 | Secatch | ......... | G06F 3/0679 |

* cited by examiner

*Primary Examiner* — Elias Mamo
(74) *Attorney, Agent, or Firm* — Holland & Hart LLP

(57) ABSTRACT

Methods, systems, and devices for sequential write operations using multiple memory dies are described. A memory system may be configured to support write operations that include writing respective subsets of a sequence of data to each first memory die of a set of multiple first memory dies, and then writing the sequence of data to a second memory die (e.g., based on reading the respective subsets of the sequence of data from the set of first memory dies). In some examples, such techniques may be implemented with memory dies having different memory cell storage densities. For example, the set of multiple first memory dies may be operated in accordance with relatively lower storage densities to leverage relatively faster access operations, whereas the second memory die may be operated in accordance with a relatively higher storage density to leverage relatively higher capacity.

18 Claims, 6 Drawing Sheets

SEQUENTIAL WRITE OPERATIONS USING MULTIPLE MEMORY DIES

FIELD OF TECHNOLOGY

The following relates to one or more systems for memory, including sequential write operations using multiple memory dies.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
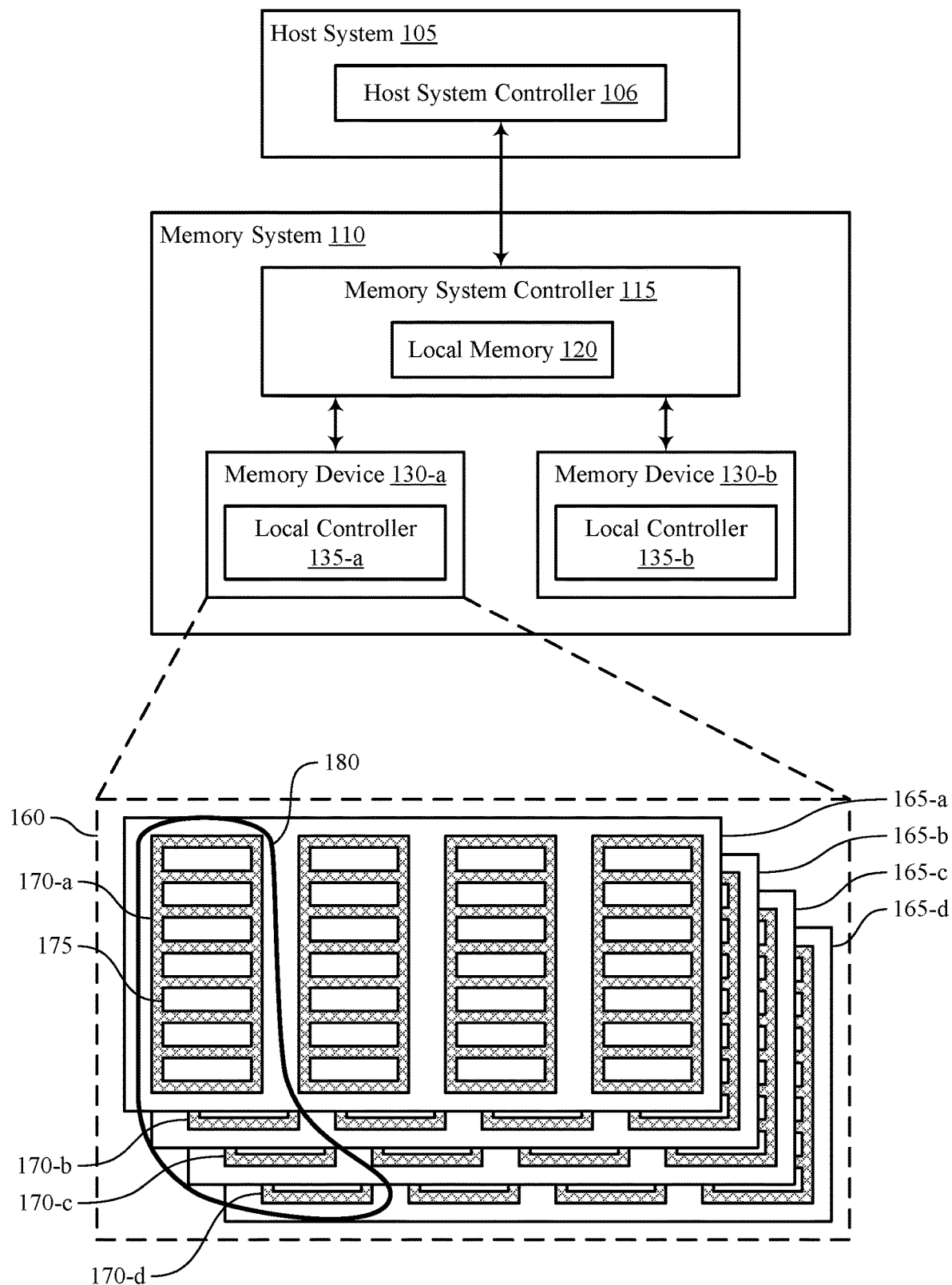
FIG. 1 illustrates an example of a system that supports sequential write operations using multiple memory dies in accordance with examples as disclosed herein.

Memory systems may be provided in accordance with various configurations that support storing information in memory cells of various cell architectures. In some configurations, such storage may be associated with performing multiple write operations for the same information. For example, information may be stored in a first set of memory cells using a first write operation, and then moved to a second set of memory cells using a second write operation, and so on. Additionally, or alternatively, stored information may be rewritten with a rewrite operation or a refresh operation to restore an originally-written state to the same memory cells. Such techniques may be associated with various memory management operations, such as garbage collection, wear leveling, refresh, and others, which may not be associated with a change in the stored information itself. Performing multiple write operations for the same information may be associated with a phenomenon referred to as "write amplification," which may refer to a relationship between an amount of information to be stored (e.g., a size of write information commanded by a host system) and an amount of information physically written to memory cells (e.g., a cumulative size of write operations performed on memory cells of the memory system to maintain the information to be stored, including write operations associated with moving or rewriting information). In some memory architectures, write amplification may be associated with decreasing an operable life of a memory system, which may result from degradation of memory cells that is associated with a quantity of access operations performed on the memory cells.

In some examples, a memory system may include portions of storage (e.g., logical portions, zones, virtual blocks) that are configured in accordance with an organizational size that supports maintaining contiguous portions of information (e.g., sequential information) in a common portion of storage (e.g., in accordance with a zoned namespace (ZNS) architecture). Such techniques may support write operations (e.g., sequential write operations) of a given sequence of information within the configured organizational size, which may reduce memory management operations such as garbage collection, among others, that may be performed more often if portions of information are smaller than the configured organizational size (e.g., if a zone includes multiple portions of non-sequential or otherwise unrelated information). The reduction of memory management operations may reduce write amplification at a memory system, and thus increase an operable life of the memory system. However, throughput of such techniques may be associated with (e.g., limited by) a throughput of writing to a single die of the memory system.

In accordance with examples as disclosed herein, a memory system may be configured to support write operations (e.g., sequential write operations, in response to one or more write commands from a host system) that include writing respective subsets of a sequence of data to each first memory die of a set of multiple first memory dies, and then writing the sequence of data (e.g., the full sequence of data) to a second memory die (e.g., based on reading the respective subsets from the set of first memory dies, which may be performed concurrently as part of a folding operation). In some examples, such operations may be associated with a host system opening a zone of the memory system having a zone size that corresponds to a size of a set of logical addresses of the memory system, such as a block or a virtual block of the second memory die. Thus, such techniques may support a zone of the memory system that is associated with a particular size, which may reduce write amplification due to various memory management operations, and throughput for writing to such a zone (e.g., from the perspective of the host system) may be increased by writing to the multiple first memory dies (e.g., concurrently, in parallel). In some examples, such techniques may be implemented with memory dies having different memory cell storage densities. For example, the set of multiple first memory dies may be operated in accordance with relatively lower storage densities, which may leverage relatively faster access operations or access operations associated with relatively lower degradation (e.g., a relatively lower write signal magnitude), whereas the second memory die may be operated in accordance with a relatively higher storage density, which may leverage relatively higher capacity. In some examples, such techniques may be implemented to mitigate memory die temperature rise by distributing write operations across a greater quantity of memory dies, among other benefits.

Figure 2:
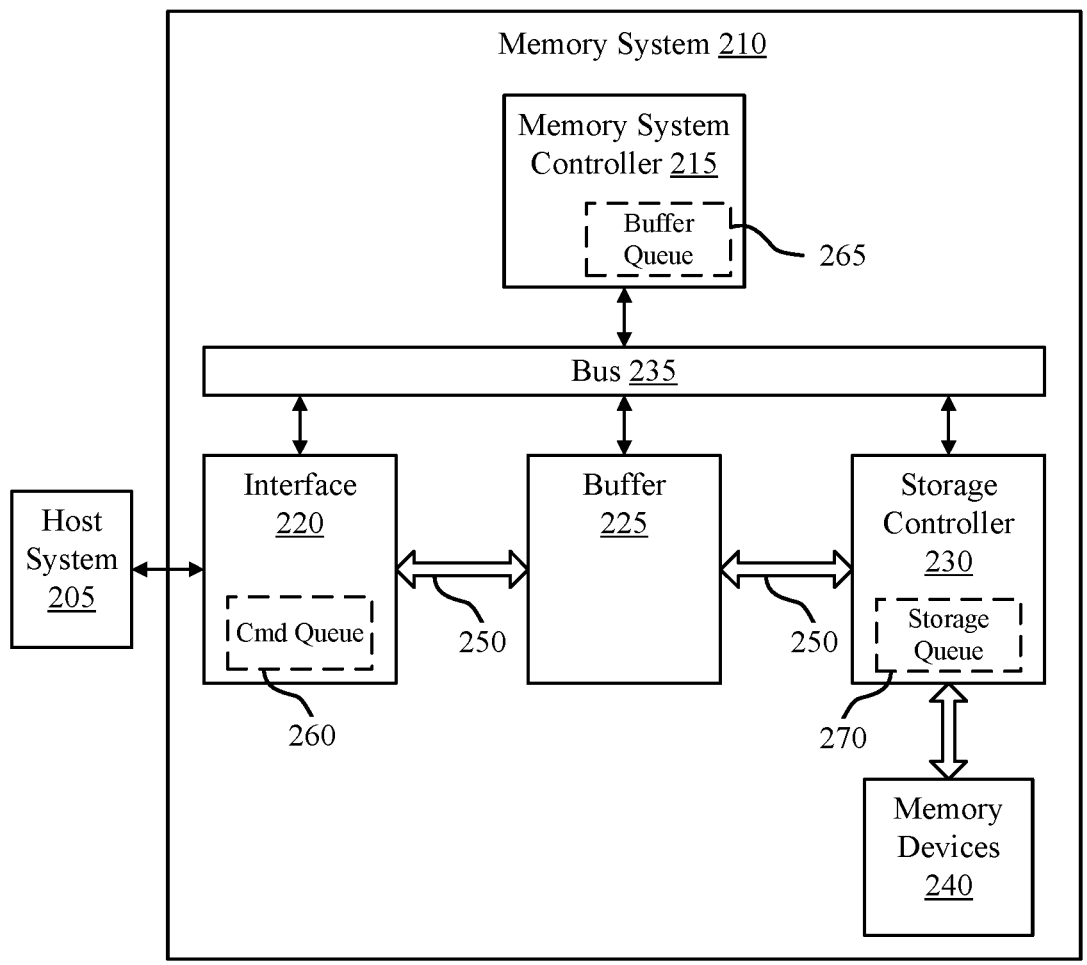
FIG. 2 illustrates an example of a system that supports sequential write operations using multiple memory dies in accordance with examples as disclosed herein.
Figure 3:
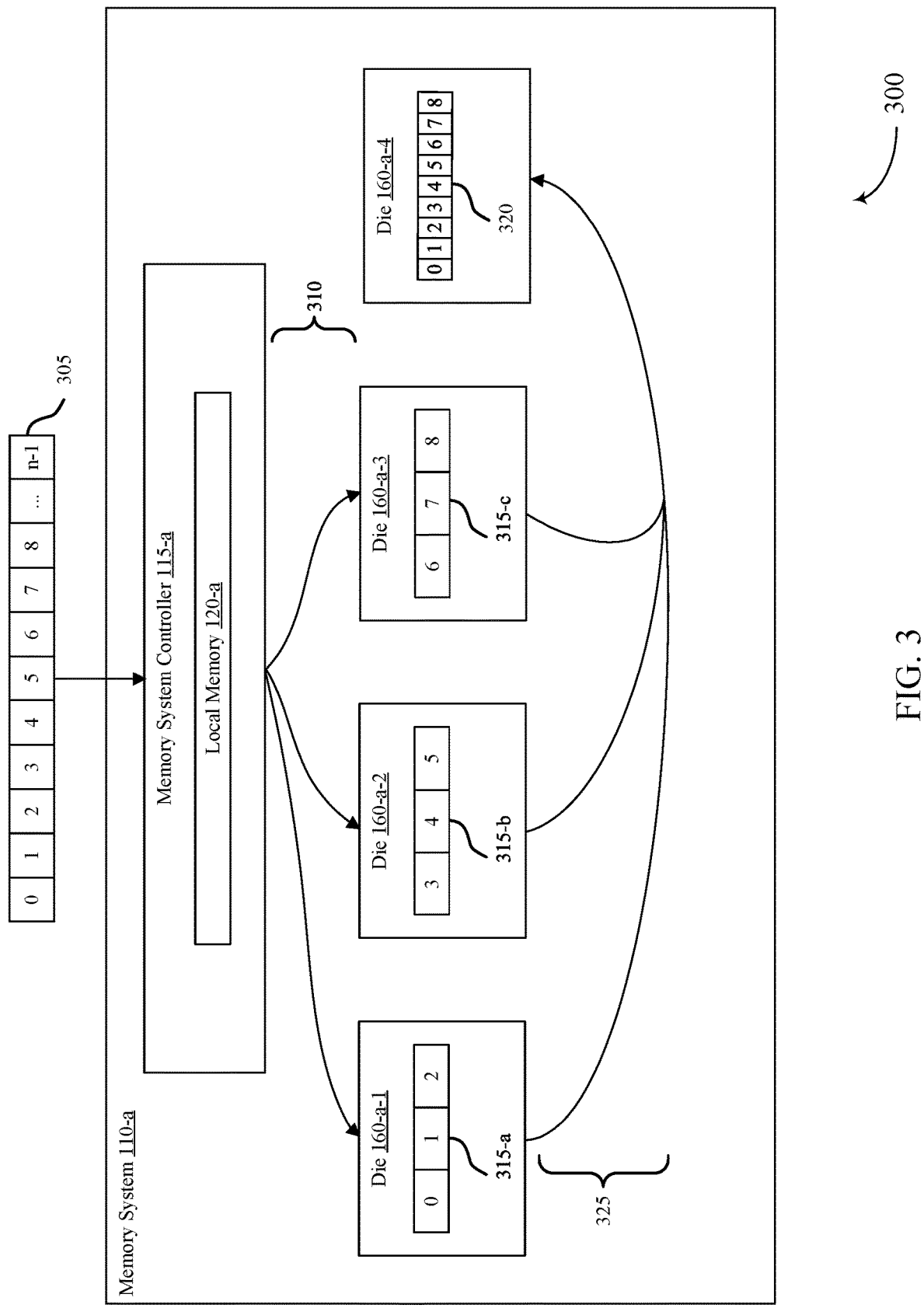
FIG. 3 illustrates an example of a system that supports sequential write operations using multiple memory dies in accordance with examples as disclosed herein.

Features of the disclosure are initially described in the context of systems, devices, and circuits with reference to FIGS. 1 through 3. Features of the disclosure are described in the context of folding arrangements with reference to FIGS. 4A and 4B. These and other features of the disclosure are further illustrated by and described in the context of an apparatus diagram and flowchart that relate to sequential write operations using multiple memory dies with reference to FIGS. 5 and 6.

FIG. 1 illustrates an example of a system 100 that supports sequential write operations using multiple memory dies in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, storage of the memory system 110 may be associated with performing multiple write operations for the same information. For example, information may be stored in a first set of memory cells using a first write operation, and then moved to a second set of memory cells using a second write operation, and so on. Additionally, or alternatively, stored information may be rewritten with a rewrite operation or a refresh operation to restore an originally-written state to the same memory cells. Such techniques may be associated with various memory management operations (e.g., garbage collection, wear leveling, refresh, and others) that may not be associated with a change in the stored information itself. Performing multiple write operations for the same information may be associated with a phenomenon referred to as "write amplification," which may refer to a relationship between an amount of information to be stored (e.g., a size of write information commanded by the host system 105) and an amount of information physically written to memory cells (e.g., a cumulative size of write operations performed on memory cells of the memory system 110 to maintain the information to be stored, including write operations associated with moving or rewriting information). Write amplification may be associated with decreasing an operable life of the memory system 110, which may result from degradation of memory cells that is associated with a quantity of access operations performed on the memory cells.

In some examples, the memory system 110 may include portions of storage (e.g., logical portions, zones, virtual blocks 180) that are configured in accordance with an organizational size that supports maintaining contiguous portions of information (e.g., sequential information) in a common portion of storage (e.g., in accordance with a zoned namespace (ZNS) architecture). Such techniques may support write operations (e.g., sequential write operations) of a given sequence of information within the configured organizational size, which may reduce memory management operations such as garbage collection, among others, that may be performed more often if portions of information are smaller than the configured organizational size (e.g., if a zone includes multiple portions of unrelated information, if a portion of information in a zone has been deleted and remaining portions of information need to be moved to another zone in a garbage collection operation to free or invalidate the zone). The reduction of memory management operations may reduce write amplification at the memory system 110, and thus increase an operable life of the memory system 110. However, throughput of such techniques may be associated with (e.g., limited by) a throughput of writing to a single die 160 of the memory system 110.

In accordance with examples as disclosed herein, the memory system 110 (e.g., a memory system controller 115) may be configured to support write operations (e.g., sequential write operations, in response to one or more write commands from a host system 105) that include writing respective subsets of a sequence of data to each first die 160 of a set of multiple first dies 160, and then writing the sequence of data (e.g., the full sequence of data) to a second die 160 (e.g., based on reading the respective subsets from the set of first dies 160, which may be performed concurrently as part of a folding operation). In some examples, such operations may be associated with the host system 105 opening a zone of the memory system 110 having a zone size that corresponds to a size of a set of logical addresses of the memory system 110, such as one or more blocks 170 or one or more virtual blocks 180 of the second die 160. Thus, such techniques may support a zone of the memory system 110 that is associated with a particular size, which may reduce write amplification due to various memory management operations, and throughput for writing to such a zone (e.g., from the perspective of the host system 105) may be increased by writing to the multiple first dies 160 (e.g., concurrently, in parallel). In some examples, such techniques may be implemented with dies 160 having different memory cell storage densities. For example, the set of multiple first dies 160 may be operated in accordance with relatively lower storage densities, such as an SLC configuration, to leverage relatively faster access operations or operations associated with relatively lower degradation (e.g., a relatively lower write signal magnitude), whereas the second die 160 may be operated in accordance with a relatively higher storage density, such as a TLC configuration or a QLC configuration, to leverage relatively higher capacity. In some examples, such techniques may be implemented to mitigate temperature rise of one or more dies 160 by distributing write operations across a greater quantity of dies 160, among other benefits.

The system 100 may include any quantity of non-transitory computer readable media that support sequential write operations using multiple memory dies. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

FIG. 2 illustrates an example of a system 200 that supports sequential write operations using multiple memory dies in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, such queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in one or more memory devices 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing.

The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) that the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In accordance with examples as disclosed herein, the memory system 210 (e.g., the memory system controller 215, the buffer 225, the storage controller 230) may be configured to support write operations (e.g., sequential write operations, in response to one or more write commands from the host system 205) that include writing respective subsets of a sequence of data to each first memory die of a set of multiple first memory dies, and then writing the sequence of data (e.g., the full sequence of data) to a second memory die (e.g., based on reading the respective subsets from the set of first memory dies, which may be performed concurrently as part of a folding operation). In some examples, such operations may be associated with the host system 205 opening a zone of the memory system 210 having a zone size that corresponds to a size of a set of logical addresses of the memory system 210, such as a block or a virtual block of the second memory die. Thus, such techniques may support a zone of the memory system 210 that is associated with a particular size, which may reduce write amplification due to various memory management operations, and a throughput for writing to such a zone (e.g., from the perspective of the host system 205) may be increased by writing to the multiple first memory dies (e.g., concurrently, in parallel).

FIG. 3 illustrates an example of a system 300 that supports sequential write operations using multiple memory dies in accordance with examples as disclosed herein. The system 300 may be an example of aspects of the system 100 or the system 200 as described with reference to FIGS. 1 and 2. For example, the system 300 may include a memory system 110-a, which may include a memory system controller 115-a, local memory 120-a, and multiple dies 160-a (e.g., multiple memory dies), which may be included in one or more memory devices 130 of the memory system 110-*a* (e.g., one or more memory devices 240). Aspects of the operations of the system 300 may be implemented by a controller (e.g., the memory system controller 115-*a*), among other components. Additionally, or alternatively, aspects of the operations of the system 300 may be implemented as instructions stored in memory (e.g., firmware stored in a memory coupled with the memory system controller 115-*a*). For example, the instructions, when executed by a controller (e.g., the memory system controller 115-*a*), may cause the controller to perform described operations of the system 300.

In some memory applications, such as mobile device applications, memory systems may be configured for operations in accordance with a flash memory management system (e.g., Flash-Friendly File System (F2FS)). An F2FS file system may be associated with various zones, which may be associated with different access frequencies. For example, an F2FS file system may be associated with six open zones, corresponding to hot, warm, and cold zones for node as well as hot, warm, and cold zones for data operations. Additionally, or alternatively, memory systems may be configured in accordance with a ZNS architecture, which may support maintaining contiguous portions of information (e.g., sequential information) in a common portion of storage (e.g., a common zone). In some examples, implementation of a ZNS architecture may reduce memory management operations, such as device-side garbage collection, and improve memory system endurance (e.g., improve a rating of terabytes written (TBW)).

In some examples, relatively small zone sizes may support relatively low write amplification from the host side. However, to support multiple-level cell architectures in some implementations (e.g., due to multiple cursors and limited resources), a memory system may first write data in accordance with an SLC configuration (e.g., to an SLC array) and then fold the data into a multiple-level cell configuration, such as a TLC configuration (e.g., to a TLC array). To reduce device-side write amplification, a memory system may create a zone having a size that is equal to the size of a virtual block 180. Thus, if a zone is associated with a size of a TLC virtual block 180, the memory system may implement three SLC virtual blocks 180 to support writing the data. However, in some implementations, such techniques may be limited to the throughput of a single memory die of the memory system. To increase throughput for write operations, such as folding write operations in accordance with a ZNS architecture, the memory system 110-*a* may be configured to support write operations (e.g., sequential write operations) that include writing respective subsets of a sequence of data to a set of multiple dies 160-*a* (e.g., in parallel, concurrently), and then writing the sequence of data (e.g., the full sequence of data) to a different die 160-*a* (e.g., based on reading the respective subsets of the sequence of data from the set of multiple dies 160-*a*, which also may be performed in parallel or concurrently), which may increase throughput for writing sequential data to a configured zone operating in accordance with a multiple-level cell architecture.

For example, the memory system 110-*a* may receive one or more commands (e.g., from a host system 105, at the memory system controller 115-*a*, via an interface 220) to write a data sequence 305 (e.g., a sequence of data, a data burst) to the memory system 110-*a*. In some examples, the one or more commands may be associated with a sequential write operation (e.g., as one or more sequential write commands from the host system 105, which may be associated with an indication of a size of the data sequence 305 or an indication of a size of a zone for opening). For illustrative purposes, the data sequence 305 may include portions of data identified by respective indices of the data sequence 305 (e.g., portions 0 through n−1), such that the data sequence 305 may be divided into n portions. Each portion of the data sequence may be illustrative of various amounts of information, such as a respective set of one or more bits of information. In some examples, the portions of the data sequence 305 may be associated with (e.g., configured with) a same amount of information.

In some examples, the one or more commands may include or be otherwise associated with a command to open a zone of a file system for writing the data sequence 305. For example, using the one or more commands, the host device may open a zone of the memory system 110-*a* (e.g., a zone in accordance with a ZNS architecture). The memory system 110-*a* may open a zone in response to receiving the one or more commands, which may include the memory system 110-*a* opening a zone associated with the die 160-*a*-4 (e.g., a targeted destination for the data sequence 305, which may be determined at the memory system 110-*a*, such as by the memory system controller 115-*a*). In some cases, a size of the zone opened by the host system 105 may correspond to a size of a set of addresses (e.g., logical addresses, physical addresses) of the memory system 110-*a*, such as a size of one or more blocks 170 or a size of a virtual block 180 (e.g., of the die 160-*a*-4). In some examples, the opened zone may be associated with storage in accordance with a multiple-level cell architecture, such as one or more TLC virtual blocks 180 or one or more QLC virtual blocks 180 of the memory system 110-*a*, among other examples, which may support leveraging a relatively higher storage density at the memory system 110-*a*. In some examples (e.g., as part of the command signaling), the data sequence 305 may be stored in a buffer or a local cache of the memory system, such as in the local memory 120-*a*, or a buffer 225 or a storage queue 270 of the memory system 110-*a*, before write operations are performed on the dies 160-*a*. In some other examples, the data sequence 305 may not be stored in a buffer or a local cache and may instead be written (e.g., directly, via the memory system controller 115-*a*) to the dies 160-*a*.

In response to the one or more commands to write the data sequence 305, the memory system 110-*a* may perform a write operation 310 (e.g., a first write operation, a parallel write operation). The write operation 310 may include writing respective data subsets 315 (e.g., subsets of the data sequence 305) to each of multiple dies 160-*a* of the memory system 110-*a*, which may include reading from the data sequence 305 from the local memory 120-*a* or another cache or buffer, or communicating the data subsets 315 directly from a command interface (e.g., an interface 220). For example, the write operation 310 may include writing a data subset 315-*a* (e.g., including portions 0, 1, and 2 of the data sequence 305) to the die 160-*a*-1, writing a data subset 315-*b* (e.g., including portions 3, 4, and 5 of the data sequence 305) to the die 160-*a*-2, and writing a data subset 315-*c* (e.g., including portions 6, 7, and 8 of the data sequence 305) to the die 160-*a*-3. Writing of other portions of the data sequence 305 (e.g., portions 9 through n−1) may be performed in another portion of the write operation 310 (not shown), or in another instance of a write operation 310, among other examples.

In some examples, a dividing of the data sequence 305 into data subsets 315 may be performed by the memory system controller 115-*a* (e.g., based on an indication of the one or more commands, in response to a determination to perform the write operation 310). Although the data subsets 315 illustrate an example of dividing the data sequence 305 (e.g., dividing the data sequence 305 into contiguous portions for each subset 315), the data sequence 305 may be divided in accordance with other techniques. For example, a first alternative data subset 315 may include portions 0, 3, and 6 of the data sequence 305, a second alternative data subset 315 may include portions 1, 4, and 7 of the data sequence 305, and a third alternative data subset 315 may include portions 2, 5, and 8 of the data sequence 305 (e.g., dividing the data sequence 305 into non-contiguous portions for each data subset 315), which may support different techniques for a subsequent folding of the data subsets 315 (e.g., in a write operation 325).

Writing the respective data subsets 315 to the dies 160-a-1 through 160-a-3 may include writing to at least one memory cell of each of the dies 160-a-1 through 160-a-3 in accordance with a memory cell storage density. In some examples, a storage density associated with the writing of the data subsets 315 may be a relatively low storage density, which may support relatively fast write operations. For example, the dies 160-a-1 through 160-a-3, or some respective portion thereof, may be configured with an SLC array, or may otherwise support a capability to write to at least a subset of the memory cells of the die 160-a in accordance with an SLC configuration (e.g., in accordance with an SLC write operation) at least during the write operation 310, which may support writing memory cells more quickly than writing in accordance with a multiple-level cell configuration.

In some examples, the write operation 310 may include writing to respective virtual blocks 180 of each of the dies 160-a-1 through 160-a-3, which may correspond to a cumulative size of portions of the data sequence 305 destined for the respective die 160-a. For example, if the write operation 310 includes writing to the dies 160-a-1 through 160-a-3 in accordance with an SLC configuration, the write operation 310 may include opening three SLC virtual blocks 180 (e.g., an SLC virtual block 180 of the die 160-a-1, an SLC virtual block 180 of the die 160-a-2, and an SLC virtual block 180 of the die 160-a-3).

In some examples, writing the respective data subsets 315 to the dies 160-a-1 through 160-a-3 may include writing to at least two of the dies 160-a concurrently (e.g., during at least partially overlapping or fully overlapping durations). For example, writing the data subset 315-a to the die 160-a-1 may be performed concurrently with writing the data subset 315-b to the die 160-a-2, which may be performed concurrently with writing the data subset 315-c to the die 160-a-3. In some implementations, writing the portion 0, the portion 3, and the portion 6, or some other configuration of portions among multiple data subsets 315, may be performed concurrently. For example, the write operation 310 may include writing the portion 0 to a portion of the die 160-a-1 (e.g., to a first die line or page of an SLC virtual block 180 of the die 160-a-1), which may be performed concurrently with writing the portion 3 to a portion of the die 160-a-2 (e.g., a first die line or page of an SLC virtual block 180 of the die 160-a-2), which may be performed concurrently with writing the portion 6 to a portion of the die 160-a-3 (e.g., a first die line or page of an SLC virtual block 180 of the die 160-a-3). Such operations may be followed by writing the portion 1 to a portion of the die 160-a-1 (e.g., a second die line or page of the SLC virtual block 180 of the die 160-a-1), which may be performed concurrently with writing the portion 4 to a portion of the die 160-a-2 (e.g., a second die line or page of the SLC virtual block 180 of the die 160-a-2), which may be performed concurrently with writing the portion 7 to a portion of the die 160-a-3 (e.g., a second die line or page of the SLC virtual block 180 of the die 160-a-3), and so on, which may be performed until writing the portion n−1 of the data sequence 305.

After performing at least a portion of the write operation 310, the memory system 110-a may perform a write operation 325 (e.g., a second write operation, a folding write operation), which may be performed in accordance with a sequential write operation (e.g., as commanded by the one or more commands from the host system 105). In some examples, the write operation 325 may begin after at least a portion of the data sequence 305 has been written to each of the dies 315-a-1 through 315-a-3 (e.g., after writing portions 0, 3, and 6). In some other examples, the write operation 325 may begin after writing all of the portions of the data sequence 305 to one of the dies 160-a (e.g., after writing the portion n−1). In some such examples, the write operation 325 may be initiated after (e.g., upon) completion of writing the portion n−1, or may be initiated based on an availability of resources of the memory system 110-a, such as after (e.g., upon) entering or otherwise during an idle period, or a period in which the memory system 110-a is not responding to other commands from the host system 105, among other initiating conditions.

The write operation 325 may include writing the data sequence 320 to another die 160-a (e.g., die 160-a-4, which may be selected from one or more dies 160-a not used for data subsets 315), where the data sequence 320 may be a reconstruction of the data sequence 305 (e.g., at the die 160-a-4). Writing the data sequence 320 may be based at least in part on reading the data subsets 315-a through 315-c from the dies 160-a-1 through 160-a-3, respectively, which may be transferred directly to the die 160-a-4 (e.g., via a storage controller 230, via the memory system controller 115-a), or may be transferred via a cache or buffer (e.g., as written to and read from the local memory 120-a during the write operation 325, as written to and read from a buffer 225 or a storage queue 270 of the memory system 110-a during the write operation 325). For example, the write operation 325 may include reading the data subset 315-a from the die 160-a-1, reading data subset 315-b from the die 160-a-2, and reading the data subset 315-c from the die 160-a-3. Reading of other portions of the data sequence 305 (e.g., portions 9 through n−1) may be performed in another portion of the write operation 325 (not shown), or in another instance of a write operation 325, among other examples.

Writing the data sequence 320 to the die 160-a-4 may include writing to at least one memory cell of the die 160-a-4 in accordance with a memory cell storage density. In some examples, a storage density associated with the writing of the data sequence 320 may be a relatively high storage density, which may support relatively higher capacity of the memory system 110-a. For example, the die 160-a-4, or some respective portion thereof, may be configured with a TLC or a QLC array, or may otherwise support a capability to write to at least a subset of the memory cells of the die 160-a-4 in accordance with a TLC or a QLC configuration (e.g., in accordance with a TLC or QLC write operation) at least during the write operation 325. Thus, in accordance with these and other examples, a quantity of dies 160-a used in the write operation 310 (e.g., three SLC dies 160-a) may be equal to a ratio of the storage density associated with the write operation 325 (e.g., a TLC write density) to the storage density associated with the write operation 310 (e.g., an SLC write density).

In some examples, the write operation 325 may include writing the data sequence 320 to a virtual block 180 of the die 160-*a*-4 (e.g., a zone of the die 160-*a*-4, as opened in response to the one or more commands), where a capacity of the virtual block 180 of the die 160-*a*-4 may be equal to a combined capacity of the virtual blocks 180 of the dies 160-*a*-1 through 160-*a*-3 written to in the write operation 310. For example, if the write operation 325 includes writing to the die 160-*a*-4 in accordance with TLC configuration, the write operation 325 may include opening a single TLC virtual block 180 of the die 160-*a*-4. In some examples, the TLC virtual block of the die 160-*a*-4 may be associated with a same quantity of memory cells, a same quantity of pages 175, or a same quantity of die lines as each of the SLC virtual blocks of the dies 160-*a*-1 through 160-*a*-3.

In some examples, reading the respective data subsets 315 from the dies 160-*a*-1 through 160-*a*-3 to support the write operation 325 may include reading from at least two of the dies 160-*a* concurrently. For example, reading the data subset 315-*a* from the die 160-*a*-1 may be performed concurrently with reading the data subset 315-*b* from the die 160-*a*-2, which may be performed concurrently with reading the data subset 315-*c* from the die 160-*a*-3. In some implementations, reading the portion 0, the portion 3, and the portion 6, or some other configuration of portions among multiple data subsets 315, may be performed concurrently. For example, the write operation 325 may include reading the portion 0 from a portion of the die 160-*a*-1 (e.g., the first die line or page of the SLC virtual block 180 of the die 160-*a*-1), which may be performed concurrently with reading the portion 3 from a portion of the die 160-*a*-2 (e.g., the first die line or page of the SLC virtual block 180 of the die 160-*a*-2), which may be performed concurrently with reading the portion 6 from a portion of the die 160-*a*-3 (e.g., the first die line or page of an SLC virtual block 180 of the die 160-*a*-3). Such operations may be followed by reading the portion 1 from a portion of the die 160-*a*-1 (e.g., the second die line or page of the SLC virtual block 180 of the die 160-*a*-1), which may be performed concurrently with reading the portion 4 from a portion of the die 160-*a*-2 (e.g., the second die line or page of the SLC virtual block 180 of the die 160-*a*-2), which may be performed concurrently with reading the portion 7 from a portion of the die 160-*a*-3 (e.g., the second die line or page of the SLC virtual block 180 of the die 160-*a*-3), and so on, which may be performed until reading the portion n−1.

Thus, in accordance with examples described with reference to the system 300, the memory system 110-*a* may support performing parallel read operations on the dies 160-*a*-1 through 160-*a*-3 (e.g., to support the write operation 325), as well as parallel write operations on the dies 160-*a*-1 through 160-*a*-3 (e.g., to support the write operation 310), which may improve folding performance for writing the data sequence 320 (e.g., from the data sequence 305). In some implementations, distributing the access operations (e.g., reading, writing) across multiple dies 160-*a* of the memory system 110-*a* may increase the throughput of sequential write performance. Additionally, or alternatively, distributing the access operations across multiple dies 160-*a* of the memory system 110-*a* may mitigate temperature rise at the dies 160-*a*, thereby increasing the operable life of the memory system 110-*a*.

Figure 4A:
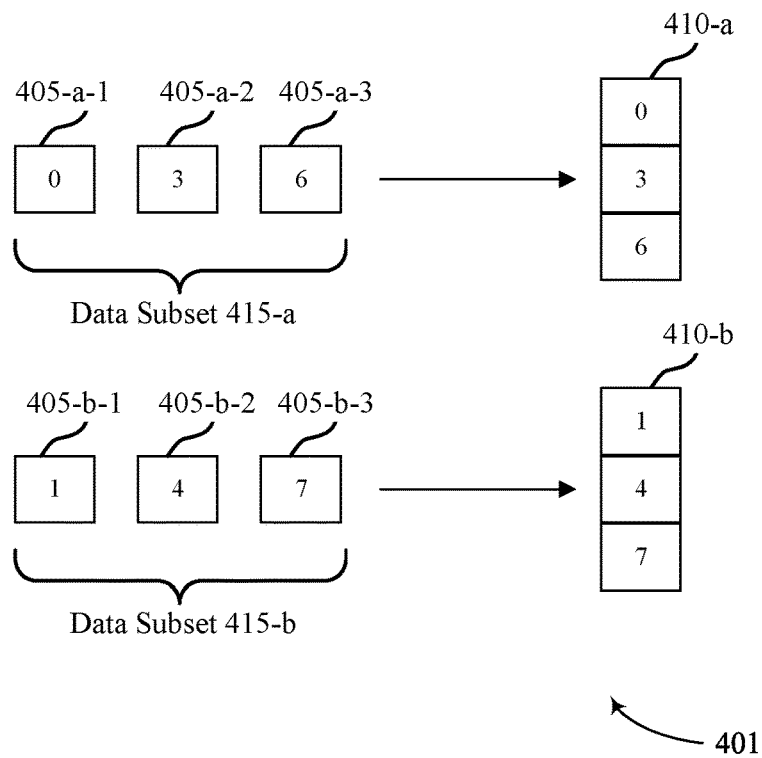
FIGS. 4A and 4B illustrate examples of folding arrangements that support sequential write operations using multiple memory dies in accordance with examples as disclosed herein
Figure 4B:
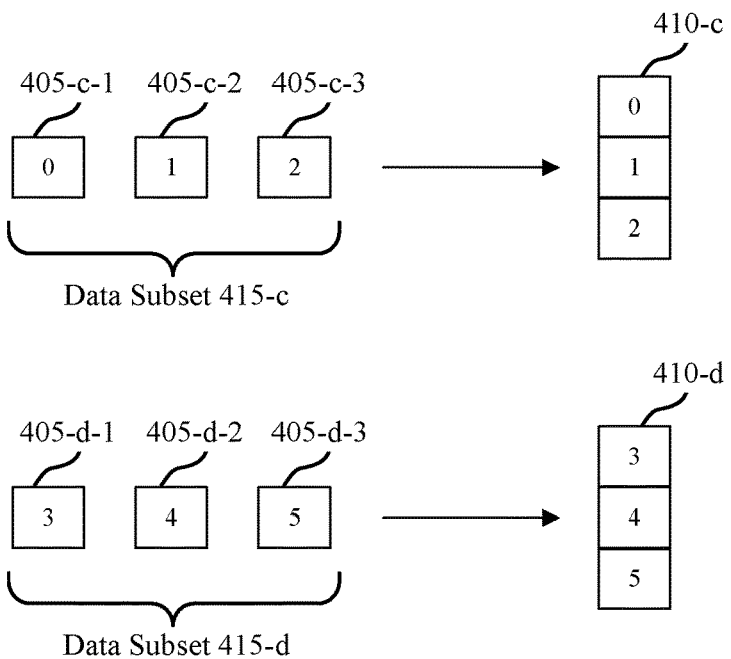

FIGS. 4A and 4B illustrate examples of folding arrangements 401 and 402 that support sequential write operations using multiple memory dies in accordance with examples as disclosed herein. The folding arrangements 401 and 402 may be implemented as part of an write operation (e.g., a folding write operation) such as the write operation 325. For example, the folding arrangements 401 and 402 may illustrate examples for folding portions of a data sequence 305 (e.g., data subsets 315 or portions thereof) for writing a data sequence 320. The folding arrangements 401 and 402 may be described relative to storage portions 405, which may refer to portions (e.g., memory cells, pages 175, dies lines) of the memory dies 160-*a*-1 through 160-*a*-3, and storage portions 410, which may refer to portions (e.g., memory cells, pages 175, dies lines) of the memory die 160-*a*-4. For example, each of the storage portions 410 may be configured to be written with a data subset 415 associated with multiple storage portions 405. The folding arrangements 401 and 402 may illustrate examples for which the storage portions 405 are configured in accordance with an SLC storage density and the storage portions 410 are configured in accordance with a TLC storage density, which may correspond to a three-to-one ratio of storage portions 405 to storage portions 410.

FIG. 4A illustrates an example of a folding arrangement 401, in which data subsets 415 refer to portions of the data sequence 305 that are stored at different ones of the memory dies 160-*a*-1 through 160-*a*-3. In other words, storage portions 405 of a given data subset 415 may be associated with different memory dies 160-*a*, which may facilitate reading multiple of the memory dies 160-*a*-1 through 160-*a*-3 concurrently. For example, the data subset 415-*a* may include portion 0 from a storage portion 405-*a*-1 of the die 160-*a*-1, portion 3 from a storage portion 405-*a*-2 of the die 160-*a*-2, and portion 6 from a storage portion 405-*a*-3 of the die 160-*a*-3, and so on. In accordance with the folding arrangement 401 (e.g., as part of a write operation 325), the respective portions of the data sequence 305 may be read from the storage portions 405 of the different memory dies 160-*a*-1 through 160-*a*-3 (e.g., in parallel, concurrently), and written to the corresponding storage portion 410 of the memory die 160-*a*-4. As illustrated, each storage portion 410 of the folding arrangement 401 may be associated with discontinuous (e.g., non-adjacent) portions of the data sequence 305. In some examples, a read operation to read the data sequence 320 may include a reorganization of portions of the data sequence 320 (e.g., to reorder portions in accordance with the data sequence 305 for output to a host system 105). In some other examples, data subsets 315 may be configured such that the folding arrangement 401 results in continuous portions of the data sequence 305 being stored in a storage portion 410 (e.g., by storing portion 0 at the die 160-*a*-1, storing portion 1 at the die 160-*a*-2, storing portion 2 at the die 160-*a* 3, and so on).

FIG. 4B illustrates an example of a folding arrangement 402, in which data subsets 415 refer to portions of the data sequence 305 that are stored a same one of the memory dies 160-*a*-1 through 160-*a*-3. In other words, storage portions 405 of a given data subset 415 may be associated with a common die 160-*a*. For example, the data subset 415-*c* may include portion 0 from a storage portion 405-*c*-1 of the die 160-*a*-1, portion 1 from a storage portion 405-*c*-2 of the die 160-*a*-1, and portion 2 from a storage portion 405-*c*-3 of the die 160-*a*-1. In accordance with the folding arrangement 402 (e.g., as part of a write operation 325), the respective portions of the data sequence 305 may be read from the storage portions 405 of the same memory die 160-*a*, which may be performed sequentially or concurrently. In some examples, the folding arrangement 402 may illustrate an example for which the memory dies 160-*a*-1 through 160- a-3 may be written to concurrently, but may not be read from concurrently. As illustrated, each storage portion 410 of the folding arrangement 402 may be associated with continuous (e.g., adjacent) portions of the data sequence 305, which may simply aspects of a read operation by simplifying or omitting aspects of a reordering procedure.

Figure 5:
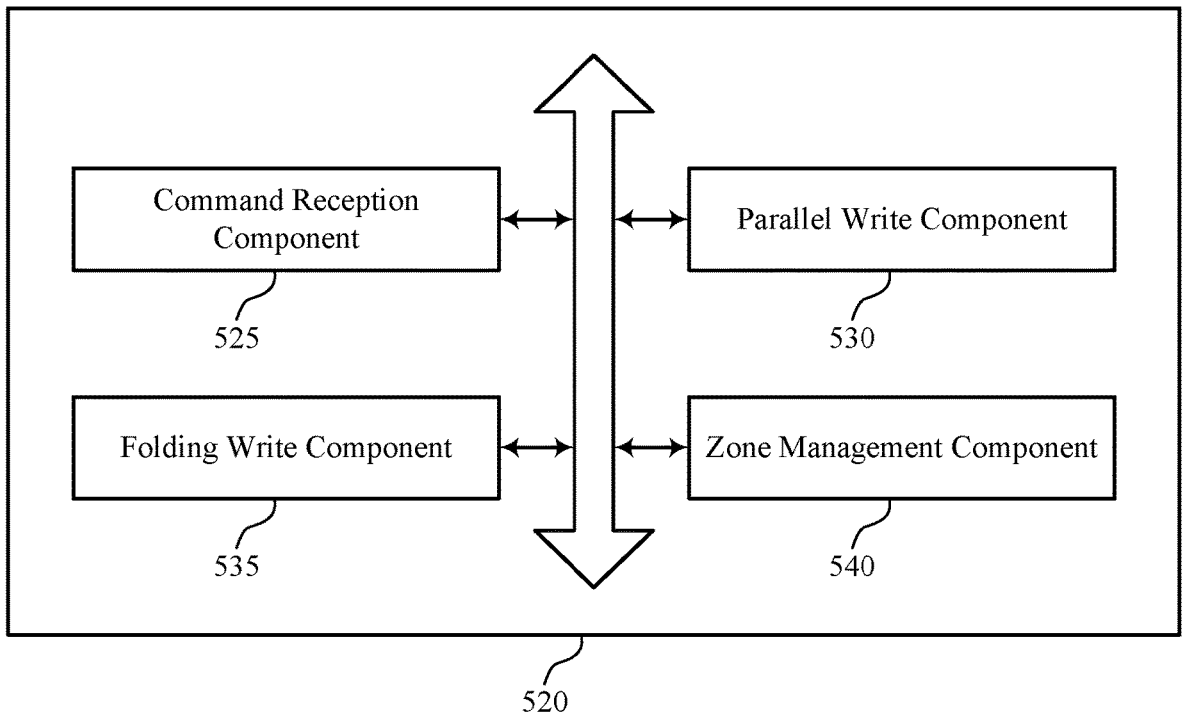
FIG. 5 shows a block diagram of a memory system that supports sequential write operations using multiple memory dies in accordance with examples as disclosed herein.

FIG. 5 shows a block diagram 500 of a memory system 520 that supports sequential write operations using multiple memory dies in accordance with examples as disclosed herein. The memory system 520 may be an example of aspects of a memory system as described with reference to FIGS. 1 through 4B. The memory system 520, or various components thereof, may be an example of means for performing various aspects of sequential write operations using multiple memory dies as described herein. For example, the memory system 520 may include a command reception component 525, a parallel write component 530, a folding write component 535, a zone management component 540, or any combination thereof. Each of these components may communicate, directly or indirectly, with one another (e.g., via one or more buses).

The command reception component 525 may be configured as or otherwise support a means for receiving one or more commands to write a sequence of data at the memory system 520. The parallel write component 530 may be configured as or otherwise support a means for writing, based at least in part on the one or more commands, a respective subset of the sequence of data to each first memory die of a plurality of first memory dies of the memory system 520. The folding write component 535 may be configured as or otherwise support a means for writing, based at least in part on reading the respective subsets of the sequence of data from the plurality of first memory dies, the sequence of data to a second memory die of the memory system 520.

In some examples, writing the respective subset of the sequence of data to each first memory die may include the parallel write component 530 writing to at least one first memory cell of each first memory die in accordance with a first memory cell storage density. In some examples, writing the sequence of data to the second memory die may include the folding write component 535 writing to at least one second memory cell of the second memory die in accordance with a second memory cell storage density. In some examples, a quantity of first memory dies of the plurality of first memory dies may be equal to a ratio of the second memory cell storage density to the first memory cell storage density.

In some examples, writing the respective subset of the sequence of data to each first memory die may include the parallel write component 530 writing to at least one first memory cell of three first memory dies in accordance with an SLC write operation. In some examples, writing the sequence of data to the second memory die may include the folding write component 535 writing to at least one second memory cell of the second memory die in accordance with a TLC write operation.

In some examples, writing the respective subset of the sequence of data to each first memory die may include the parallel write component 530 writing to at least one first memory cell of four first memory dies in accordance with an SLC write operation. In some examples, writing the sequence of data to the second memory die may include the folding write component 535 writing to at least one second memory cell of the second memory die in accordance with a QLC write operation.

In some examples, writing the respective subset of the sequence of data to each first memory die may include the parallel write component 530 writing the respective subset of the sequence of data to a quantity of first memory cells of each first memory die of the plurality of first memory dies. In some examples, writing the sequence of data to the second memory die may include the folding write component 535 writing the sequence of data to the quantity of first memory cells of the second memory die.

In some examples, to support writing the respective subset of the sequence of data to each first memory die, the parallel write component 530 may be configured as or otherwise support a means for writing to at least two first memory dies of the plurality of first memory dies concurrently.

In some examples, to support reading the respective subsets of the sequence of data from the plurality of first memory dies, the folding write component 535 may be configured as or otherwise support a means for reading from at least two first memory dies of the plurality of first memory dies concurrently.

In some examples, the one or more commands may be associated with a sequential write operation, and writing the sequence of data to the second memory die may be performed in accordance with the sequential write operation.

In some examples, writing the respective subset of the sequence of data to each first memory die may include the parallel write component 530 writing to a respective first virtual block of each first memory die of the plurality of first memory dies. In some examples, writing the sequence of data to the second memory die may include the folding write component 535 writing to a second virtual block of the second memory die.

In some examples, a capacity of the second virtual block may be equal to a combined capacity of the respective first virtual blocks of each first memory die.

In some examples, the one or more commands may include a command to open a zone of a file system for writing the sequence of data. In some examples, writing the sequence of data to the second memory die may include the folding write component 535 writing in accordance with the zone of the file system.

Figure 6:
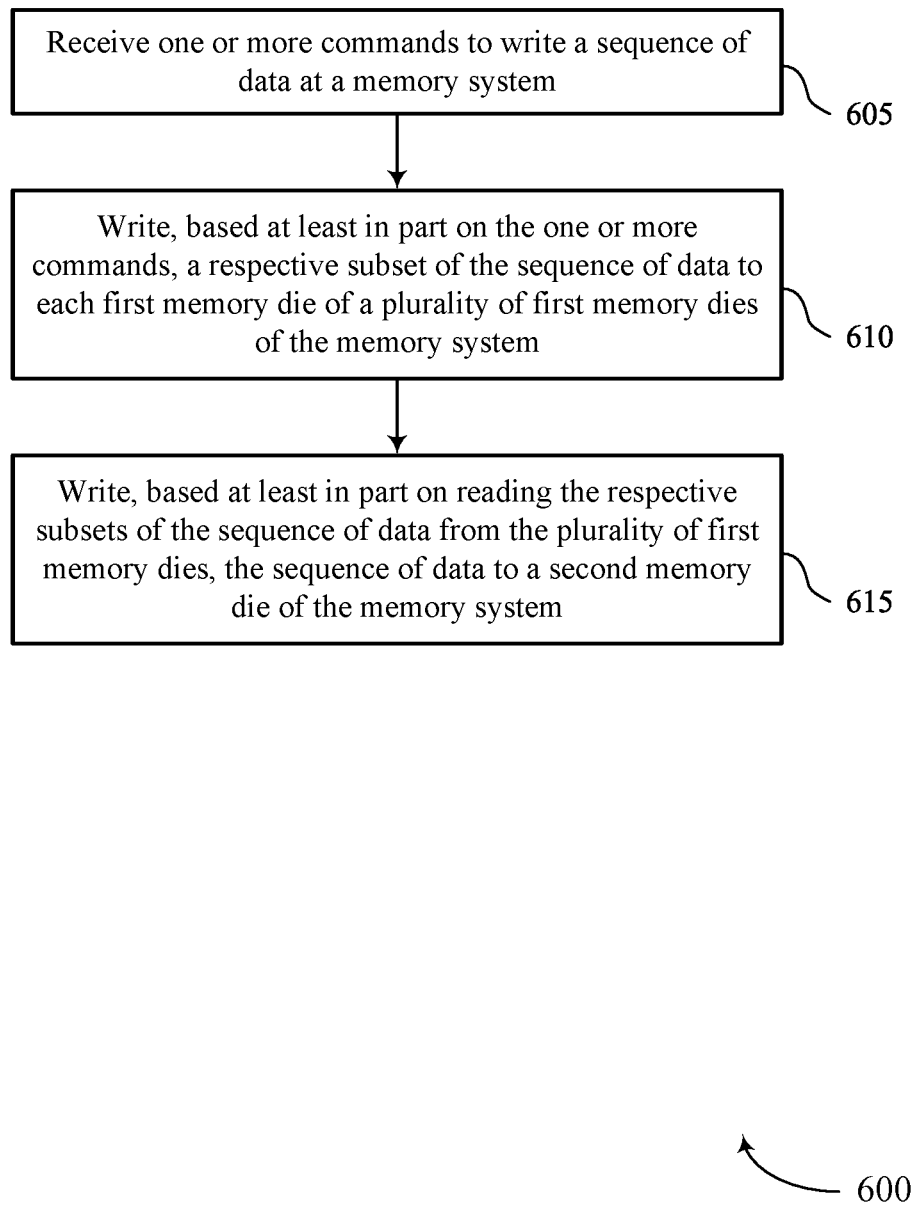
FIG. 6 shows a flowchart illustrating a method or methods that support sequential write operations using multiple memory dies in accordance with examples as disclosed herein.

FIG. 6 shows a flowchart illustrating a method 600 that supports sequential write operations using multiple memory dies in accordance with examples as disclosed herein. The operations of method 600 may be implemented by a memory system or its components as described herein. For example, the operations of method 600 may be performed by a memory system as described with reference to FIGS. 1 through 4B. In some examples, a memory system may execute a set of instructions to control the functional elements of the device to perform the described functions. Additionally, or alternatively, the memory system may perform aspects of the described functions using special-purpose hardware.

At 605, the method may include receiving one or more commands to write a sequence of data at a memory system. The operations of 605 may be performed in accordance with examples as disclosed herein. In some examples, aspects of the operations of 405 may be performed by a command reception component 525 as described with reference to FIG. 5.

At 610, the method may include writing, based at least in part on the one or more commands, a respective subset of the sequence of data to each first memory die of a plurality of first memory dies of the memory system. The operations of 610 may be performed in accordance with examples as disclosed herein. In some examples, aspects of the operations of 610 may be performed by a parallel write component 530 as described with reference to FIG. 5.

At 615, the method may include writing, based at least in part on reading the respective subsets of the sequence of data from the plurality of first memory dies, the sequence of data to a second memory die of the memory system. The operations of 615 may be performed in accordance with examples as disclosed herein. In some examples, aspects of the operations of 615 may be performed by a folding write component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving one or more commands to write a sequence of data at a memory system; writing, based at least in part on the one or more commands, a respective subset of the sequence of data to each first memory die of a plurality of first memory dies of the memory system; and writing, based at least in part on reading the respective subsets of the sequence of data from the plurality of first memory dies, the sequence of data to a second memory die of the memory system.

Aspect 2: The method, apparatus, or non-transitory computer-readable medium of aspect 1, where writing the respective subset of the sequence of data to each first memory die includes writing to at least one first memory cell of each first memory die in accordance with a first memory cell storage density, and writing the sequence of data to the second memory die includes writing to at least one second memory cell of the second memory die in accordance with a second memory cell storage density.

Aspect 3: The method, apparatus, or non-transitory computer-readable medium of aspect 2, where a quantity of first memory dies of the plurality of first memory dies is equal to a ratio of the second memory cell storage density to the first memory cell storage density.

Aspect 4: The method, apparatus, or non-transitory computer-readable medium of any of aspects 2 through 3, where writing the respective subset of the sequence of data to each first memory die includes writing to at least one first memory cell of three first memory dies in accordance with an SLC write operation, and writing the sequence of data to the second memory die includes writing to at least one second memory cell of the second memory die in accordance with a TLC write operation.

Aspect 5: The method, apparatus, or non-transitory computer-readable medium of any of aspects 2 through 3, where writing the respective subset of the sequence of data to each first memory die includes writing to at least one first memory cell of four first memory dies in accordance with an SLC write operation, and writing the sequence of data to the second memory die includes writing to at least one second memory cell of the second memory die in accordance with a QLC write operation.

Aspect 6: The method, apparatus, or non-transitory computer-readable medium of any of aspects 1 through 5, where writing the respective subset of the sequence of data to each first memory die includes writing the respective subset of the sequence of data to a quantity of first memory cells of each first memory die of the plurality of first memory dies, and writing the sequence of data to the second memory die includes writing the sequence of data to the quantity of first memory cells of the second memory die.

Aspect 7: The method, apparatus, or non-transitory computer-readable medium of any of aspects 1 through 6, where writing the respective subset of the sequence of data to each first memory die includes operations, features, circuitry, logic, means, or instructions, or any combination thereof for writing to at least two first memory dies of the plurality of first memory dies concurrently.

Aspect 8: The method, apparatus, or non-transitory computer-readable medium of any of aspects 1 through 7, where reading the respective subsets of the sequence of data from the plurality of first memory dies includes operations, features, circuitry, logic, means, or instructions, or any combination thereof for reading from at least two first memory dies of the plurality of first memory dies concurrently.

Aspect 9: The method, apparatus, or non-transitory computer-readable medium of any of aspects 1 through 8, where the one or more commands are associated with a sequential write operation and writing the sequence of data to the second memory die is performed in accordance with the sequential write operation.

Aspect 10: The method, apparatus, or non-transitory computer-readable medium of any of aspects 1 through 9, where writing the respective subset of the sequence of data to each first memory die includes writing to a respective first virtual block of each first memory die of the plurality of first memory dies and writing the sequence of data to the second memory die includes writing to a second virtual block of the second memory die.

Aspect 11: The method, apparatus, or non-transitory computer-readable medium of aspect 10, where a capacity of the second virtual block is equal to a combined capacity of the respective first virtual blocks of each first memory die.

Aspect 12: The method, apparatus, or non-transitory computer-readable medium of any of aspects 1 through 11, where the one or more commands include a command to open a zone of a file system for writing the sequence of data and writing the sequence of data to the second memory die includes writing in accordance with the zone of the file system.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: a plurality of memory dies of a memory system; and a controller coupled with the plurality of memory dies and configured to cause the apparatus to: receive one or more commands to write a sequence of data at the memory system; write, based at least in part on the one or more commands, a respective subset of the sequence of data to each first memory die of a plurality of first memory dies of the plurality of memory dies; and write, based at least in part on reading the respective subsets of the sequence of data from the plurality of first memory dies, the sequence of data to a second memory die of the plurality of memory dies.

Aspect 14: The apparatus of aspect 13, where, to write the respective subset of the sequence of data to each first memory die, the controller is configured to cause the apparatus to write to at least one first memory cell of each first memory die in accordance with a first memory cell storage density; and to write the sequence of data to the second memory die, the controller is configured to cause the apparatus to write to at least one second memory cell of the second memory die in accordance with a second memory cell storage density.

Aspect 15: The apparatus of aspect 14, where a quantity of first memory dies of the plurality of first memory dies is equal to a ratio of the second memory cell storage density to the first memory cell storage density.

Aspect 16: The apparatus of any of aspects 14 through 15, where: to write the respective subset of the sequence of data to each first memory die, the controller is configured to cause the apparatus to write to at least one first memory cell of three first memory dies in accordance with an SLC write operation; and to write the sequence of data to the second memory die, the controller is configured to cause the apparatus to write to at least one second memory cell of the second memory die in accordance with a TLC write operation.

Aspect 17: The apparatus of any of aspects 14 through 15, where: to write the respective subset of the sequence of data to each first memory die, the controller is configured to cause the apparatus to write to at least one first memory cell of four first memory dies in accordance with an SLC write operation; and to write the sequence of data to the second memory die, the controller is configured to cause the apparatus to write to at least one second memory cell of the second memory die in accordance with a QLC write operation.

Aspect 18: The apparatus of any of aspects 13 through 17, where: to write the respective subset of the sequence of data to each first memory die, the controller is configured to cause the apparatus to write the respective subset of the sequence of data to a quantity of first memory cells of each first memory die of the plurality of first memory dies; and to write the sequence of data to the second memory die, the controller is configured to cause the apparatus to write the sequence of data to the quantity of first memory cells of the second memory die.

Aspect 19: The apparatus of any of aspects 13 through 18, where to write the respective subset of the sequence of data to each first memory die, the controller is configured to cause the apparatus to: write to at least two first memory dies of the plurality of first memory dies concurrently.

Aspect 20: The apparatus of any of aspects 13 through 19, where to read the respective subsets of the sequence of data from the plurality of first memory dies, the controller is configured to cause the apparatus to: read from at least two first memory dies of the plurality of first memory dies concurrently.

Aspect 21: The apparatus of any of aspects 13 through 20, where: the one or more commands are associated with a sequential write operation; and to write the sequence of data to the second memory die, the controller is configured to cause the apparatus to write the sequence of data to the second memory die in accordance with the sequential write operation.

Aspect 22: The apparatus of any of aspects 13 through 21, where: to write the respective subset of the sequence of data to each first memory die, the controller is configured to cause the apparatus to write to a respective first virtual block of each first memory die of the plurality of first memory dies; and to write the sequence of data to the second memory die, the controller is configured to cause the apparatus to write to a second virtual block of the second memory die.

Aspect 23: The apparatus of aspect 22, where a capacity of the second virtual block is equal to a combined capacity of the respective first virtual blocks of each first memory die.

Aspect 24: The apparatus of any of aspects 13 through 23, where: the one or more commands include a command to open a zone of a file system for writing the sequence of data; and to write the sequence of data to the second memory die, the controller is configured to cause the apparatus to write in accordance with the zone of the file system.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a plurality of memory dies; and
processing circuitry coupled with the plurality of memory dies and configured to cause the memory system to:
receive one or more commands associated with a sequential write operation and indicating to write a sequence of data at the memory system in accordance with an ordering of the sequential write operation, the one or more commands comprising a command to open a zone of a file system for writing the sequence of data;
write, based at least in part on the one or more commands, a respective subset of the sequence of data to each first memory die of a plurality of first memory dies of the plurality of memory dies;
read the respective subsets of the sequence of data from the plurality of first memory dies; and
write, based at least in part on organizing the respective subsets of the sequence of data in accordance with the ordering of the sequential write operation, the sequence of data to a second memory die of the plurality of memory dies in accordance with the ordering of the sequential write operation and in accordance with the zone of the file system being open, the zone associated with the second memory die.

2. The memory system of claim 1, wherein:
to write the respective subset of the sequence of data to each first memory die, the processing circuitry is configured to cause the memory system to write to at least one first memory cell of each first memory die in accordance with a first memory cell storage density; and
to write the sequence of data to the second memory die, the processing circuitry is configured to cause the memory system to write to at least one second memory cell of the second memory die in accordance with a second memory cell storage density.

3. The memory system of claim 2, wherein a quantity of first memory dies of the plurality of first memory dies is equal to a ratio of the second memory cell storage density to the first memory cell storage density.

4. The memory system of claim 2, wherein:
to write the respective subset of the sequence of data to each first memory die, the processing circuitry is configured to cause the memory system to write to at least one first memory cell of three first memory dies in accordance with a single level cell (SLC) write operation; and
to write the sequence of data to the second memory die, the processing circuitry is configured to cause the memory system to write to at least one second memory cell of the second memory die in accordance with a tri-level cell (TLC) write operation.

5. The memory system of claim 2, wherein:
to write the respective subset of the sequence of data to each first memory die, the processing circuitry is configured to cause the memory system to write to at least one first memory cell of four first memory dies in accordance with a single level cell (SLC) write operation; and
to write the sequence of data to the second memory die, the processing circuitry is configured to cause the memory system to write to at least one second memory cell of the second memory die in accordance with a quad-level cell (QLC) write operation.

6. The memory system of claim 1, wherein:
to write the respective subset of the sequence of data to each first memory die, the processing circuitry is configured to cause the memory system to write the respective subset of the sequence of data to a quantity of first memory cells of each first memory die of the plurality of first memory dies; and
to write the sequence of data to the second memory die, the processing circuitry is configured to cause the memory system to write the sequence of data to the quantity of first memory cells of the second memory die.

7. The memory system of claim 1, wherein to write the respective subset of the sequence of data to each first memory die, the processing circuitry is configured to cause the memory system to:
write to at least two first memory dies of the plurality of first memory dies concurrently.

8. The memory system of claim 1, wherein to read the respective subsets of the sequence of data from the plurality of first memory dies, the processing circuitry is configured to cause the memory system to:
read from at least two first memory dies of the plurality of first memory dies concurrently.

9. A memory system, comprising:
a plurality of memory dies; and
processing circuitry coupled with the plurality of memory dies and configured to cause the memory system to:
receive one or more commands to write a sequence of data at the memory system;
write, based at least in part on the one or more commands, a respective subset of the sequence of data to a respective first virtual block of each first memory die of a plurality of first memory dies; and
write, based at least in part on reading the respective subsets of the sequence of data from the plurality of first memory dies, the sequence of data to a second virtual block of a second memory die of the plurality of memory dies.

10. The memory system of claim 9, wherein a capacity of the second virtual block is equal to a combined capacity of the respective first virtual blocks of each first memory die.

11. A non-transitory computer-readable medium storing code comprising instructions which, when executed by processing circuitry of an electronic device, cause the electronic device to:
receive one or more commands associated with a sequential write operation and indicating to write a sequence of data at a memory system in accordance with an ordering of the sequential write operation, the one or more commands comprising a command to open a zone of a file system for writing the sequence of data;
write, based at least in part on the one or more commands, a respective subset of the sequence of data to each first memory die of a plurality of first memory dies of the memory system;
read the respective subsets of the sequence of data from the plurality of first memory dies; and
write, based at least in part on organizing the respective subsets of the sequence of data in accordance with the ordering of the sequential write operation, the sequence of data to a second memory die of the plurality of memory dies in accordance with the ordering of the sequential write operation and in accordance with the zone of the file system being open, the zone associated with the second memory die.

12. The non-transitory computer-readable medium of claim 11, wherein:
to write the respective subset of the sequence of data to each first memory die, the instructions, when executed by the processing circuitry of the electronic device, cause the electronic device to write to at least one first memory cell of each first memory die in accordance with a first memory cell storage density; and
to write the sequence of data to the second memory die, the instructions, when executed by the processing circuitry of the electronic device, cause the electronic device to write to at least one second memory cell of the second memory die in accordance with a second memory cell storage density.

13. The non-transitory computer-readable medium of claim 12, wherein a quantity of first memory dies of the plurality of first memory dies is equal to a ratio of the second memory cell storage density to the first memory cell storage density.

14. The non-transitory computer-readable medium of claim 12, wherein:
to write the respective subset of the sequence of data to each first memory die, the instructions, when executed by the processing circuitry of the electronic device, cause the electronic device to write to at least one first memory cell of three first memory dies in accordance with a single level cell (SLC) write operation; and
to write the sequence of data to the second memory die, the instructions, when executed by the processing circuitry of the electronic device, cause the electronic device to write to at least one second memory cell of the second memory die in accordance with a tri-level cell (TLC) write operation.

15. The non-transitory computer-readable medium of claim 12, wherein:
to write the respective subset of the sequence of data to each first memory die, the instructions, when executed by the processing circuitry of the electronic device, cause the electronic device to write to at least one first memory cell of four first memory dies in accordance with a single level cell (SLC) write operation; and
to write the sequence of data to the second memory die, the instructions, when executed by the processing circuitry of the electronic device, cause the electronic device to write to at least one second memory cell of the second memory die in accordance with a quad-level cell (QLC) write operation.

16. The non-transitory computer-readable medium of claim 11, wherein:
to write the respective subset of the sequence of data to each first memory die, the instructions, when executed by the processing circuitry of the electronic device, cause the electronic device to write the respective subset of the sequence of data to a quantity of first memory cells of each first memory die of the plurality of first memory dies; and
to write the sequence of data to the second memory die, the instructions, when executed by the processing circuitry of the electronic device, cause the electronic device to write the sequence of data to the quantity of first memory cells of the second memory die.

17. The non-transitory computer-readable medium of claim 11, wherein to write the respective subset of the sequence of data to each first memory die, the instructions, when executed by the processing circuitry of the electronic device, cause the electronic device to:
write to at least two first memory dies of the plurality of first memory dies concurrently.

18. A method by a memory system, comprising:
receiving one or more commands associated with a sequential write operation and indicating to write a sequence of data at the memory system in accordance with an ordering of the sequential write operation, the one or more commands comprising a command to open a zone of a file system for writing the sequence of data;
writing, based at least in part on the one or more commands, a respective subset of the sequence of data to each first memory die of a plurality of first memory dies of the memory system;
reading the respective subsets of the sequence of data from the plurality of first memory dies; and
writing, based at least in part on organizing the respective subsets of the sequence of data in accordance with the ordering of the sequential write operation, the sequence of data to a second memory die of the plurality of memory dies in accordance with the ordering of the sequential write operation and in accordance with the zone of the file system being open, the zone associated with the second memory die.

* * * * *